United States Patent

Angley et al.

[11] Patent Number: 5,902,068
[45] Date of Patent: May 11, 1999

[54] VEHICLE ARRESTING UNIT FABRICATION METHODS

[75] Inventors: Richard D. Angley, Aston; Michael S. Ciesielski, Broomall; Christopher T. Dial, Lansdowne; Peter T. Mahal, Ardmore, all of Pa.

[73] Assignee: Datron, Inc., Garland, Tex.

[21] Appl. No.: 08/796,969

[22] Filed: Feb. 7, 1997

[51] Int. Cl.⁶ .................. C04B 7/02; B60T 1/04
[52] U.S. Cl. ............................. 404/34; 249/2
[58] Field of Search .................. 106/672, 682, 106/676; 249/2, 4; 404/17, 34, 45, 72, 75, 82

[56] References Cited

U.S. PATENT DOCUMENTS

| | | | |
|---|---|---|---|
| 378,825 | 2/1888 | Brannigan | 404/34 |
| 3,066,896 | 12/1962 | Schirtzinger | |
| 3,867,159 | 2/1975 | Ergene | |
| 3,967,704 | 7/1976 | Ogden | |
| 3,969,851 | 7/1976 | Whitacre | 404/17 |
| 4,021,258 | 5/1977 | Uogaeshi | 106/99 |
| 4,168,924 | 9/1979 | Draper et al. | 404/45 X |
| 4,504,320 | 3/1985 | Rizer et al. | 106/98 |
| 5,063,967 | 11/1991 | Stevens | |
| 5,141,363 | 8/1992 | Stevens | |
| 5,154,837 | 10/1992 | Jones | 249/2 |
| 5,193,764 | 3/1993 | Larratt | |
| 5,241,993 | 9/1993 | Stevens | |
| 5,419,632 | 5/1995 | Stevens | |
| 5,789,681 | 8/1998 | Angley et al. | 73/803 |

FOREIGN PATENT DOCUMENTS

| | | |
|---|---|---|
| 11 00 064 | 2/1961 | Germany . |
| 1 092 255 | 11/1967 | United Kingdom . |
| 1 122 297 | 8/1968 | United Kingdom . |
| 1 169 415 | 11/1969 | United Kingdom . |
| 1 449 824 | 9/1976 | United Kingdom . |

OTHER PUBLICATIONS

*Standard Test Method for Compressive Strength of Lightweight Insulating Concrete,* (C495–86), American Society for Testing and Materials, Dec. 1986.

Cook, Robert F., *Evaluation of a Foam Arrestor Bed for Aircraft Safety Overrun Areas,* (UDR–TR–88–07), University of Dayton Research Institute, Jan. 1988.

McMichael, Steve and Fisher, Steve, "Understanding Materials with Instrumented Impact",*Mechanical Engineering,* Apr. 1989.

(List continued on next page.)

*Primary Examiner*—James A. Lisehora
*Attorney, Agent, or Firm*—Kenneth P. Robinson

[57] ABSTRACT

Vehicle arresting blocks of cellular concrete are usable to safely slow travel of an object and may be used to construct an aircraft arresting bed at the end of an airport runway. For such purposes, cellular concrete blocks must be fabricated to exhibit compressive gradient strengths of predetermined values to provide sufficient, but not excessive, deceleration forces on an object. Material uniformity characteristics must be met to avoid unacceptable drag force variations, so that arresting blocks desirably exhibit a predetermined compressive gradient strength (e.g., a 60/80 CGS) over a depth of penetration of 10 to 66 percent of block thickness. A 60/80 CGS will typically represent an average compressive strength of 70 pounds per square inch over such depth of penetration. Prior applications of cellular concrete typically involved meeting minimum strength values and the production methods did not meet uniformity or compressive gradient strength predictability as required for arresting blocks. Described methods include parameter, ingredient and process controls and ranges effective to enable fabrication of arresting blocks having dry densities and compressive gradient strengths which can be specified in order to provide limited deceleration of aircraft and other objects. Limited deceleration can avoid destructive effects inherent in excess rates of deceleration. SEQUENCE LISTING (Not Applicable)

33 Claims, 5 Drawing Sheets

OTHER PUBLICATIONS

Balaguru, P. and Ramakrishnan, Seetharaman, *Properties of Lightweight Cement Composite Containing Ceramic Spheres*, (Civil Engineering Report No. 92–11), The State University of New Jersey, Rutgers, Nov. 1992.

"Quality Assurance of Batch Mixed Cellular Concrete", Cellufoam Concrete Systems, Dec. 1994.

*Preliminary Soft Ground Arrestor Design for JFK International Airport*, (Draft of Final Report DOT/FAA/CT–95), Mar. 1995.

Brochure: "Mearlcrete Cellular Concrete Production Methods and Equipment", The Mearl Corporation, Sep. 1986.

Brochure: "Structural and Nonstructural Mearlcrete Cellular Concrete Applications and Properties", The Mearl Corporation, Dec. 1987.

Brochure: "Lightweight Cellular Concrete", Anthes Celcon/Anthes Equipment, date unknown.

Brochure: "E–SORB Hollow Sphere Composites for Energy Absorption", Microcel Technology, Inc., date unknown.

Brochure: "Geotechnical Grouting Applications Using Low Density Cellular Concrete", Pacific international Grout Co., date unknown.

Brochure: "Light–Weight Cement Foam Technology", Zementschaum–Technik International GmbH, date unknown.

Brochure: "Light–Weight Foam Technology", Zementschaum–Technik International GmbH, date unknown.

Rivkind, L. E., "Improved Technology for Rigid Inorganic Foams", *Cellular Plastics*, Jul. 1967.

ACI Committee 523, "Guide for Cast–in–Place Low Density Concrete", *ACI Journal*, Sep. 1967.

VEHICLE ARRESTING UNIT FABRICATION METHODS

RELATED APPLICATIONS (Not Applicable)

FEDERALLY SPONSORED RESEARCH (Not Applicable)

BACKGROUND OF THE INVENTION

This invention relates to slowing motion of objects and, more particularly, to cellular concrete units suitable for use in arresting bed systems to safely decelerate an aircraft which runs off the end of a runway, and methods for producing such units.

Aircraft can and do overrun the ends of runways raising the possibility of injury to passengers and destruction of or severe damage to the aircraft. Such overruns have occurred during aborted take-offs or while landing, with the aircraft traveling at speeds to 80 knots. In order to minimize the hazards of overruns, the Federal Aviation Administration (FAA) generally requires a safety area of 1,000 feet in length beyond the end of the runway. Although this safety area is now an FAA standard, many runways across the country were constructed prior to its adoption and are situated such that water, roadways or other obstacles prevent economical compliance with the one thousand foot overrun requirement.

Several materials, including existing soil surfaces beyond the runway have been assessed for their ability to decelerate aircraft. Soil surfaces are very unpredictable in their arresting capability because their properties are unpredictable. For example, very dry clay can be hard and nearly impenetrable, but wet clay can cause aircraft to mire down quickly, cause the landing gear to collapse, and provide a potential for passenger and crew injury as well as greater aircraft damage.

A 1988 report addresses an investigation by the Port Authority of New York and New Jersey on the feasibility of developing a plastic foam arrestor for a runway at JFK International Airport. In the report, it is stated that analyses indicated that such an arrestor design is feasible and could safely stop a 100,000 pound aircraft overrunning the runway at an exit velocity up to 80 knots and an 820,000 pound aircraft overrunning at an exit velocity up to 60 knots. The report states that performance of an appropriate plastic foam arrestor configuration was shown to be potentially "superior to a paved 1,000 foot overrun area, particularly when braking is not effective and reverse thrust is not available." As is well known, effectiveness of braking may be limited under wet or icy surface conditions. (University of Dayton report UDR-TR-88-07, January 1988.)

More recently, an aircraft arresting system has been described in U.S. Pat. No. 5,193,764 to Larrett et al. In accordance with the disclosure of that patent, an aircraft arresting area is formed by adhering a plurality of stacked thin layers of rigid, friable, fire resistant phenolic foam to each other, with the lower-most layer of foam being adhered to a support surface. The stacked layers are designed so that the compressive resistance of the combined layers of rigid plastic foam is less than the force exerted by the landing gear of any aircraft of the type intended to be arrested when moving into the arresting area from a runway so that the foam is crushed when contacted by the aircraft. The preferred material is phenolic foam used with a compatible adhesive, such as a latex adhesive.

Tests of phenolic foam based arrestor systems indicate that while such systems can function to bring aircraft to a stop, the use of the foam material has disadvantages. Major among the disadvantages is the fact that foam, depending upon its properties, can typically exhibit a rebound property. Thus, it was noted in phenolic foam arresting bed testing that some forward thrust was delivered to the wheels of the aircraft as it moved through the foamed material as a result of the rebound of the foam material itself.

Foamed or cellular concrete as a material for use in arresting bed systems has been suggested and undergone limited field testing in the prior art. Such testing has indicated that cellular concrete has good potential for use in arresting bed systems, based on providing many of the same advantages as phenolic foam while avoiding some of phenolic foam's disadvantages. However, the requirements for an accurately controlled crushing strength and material uniformity throughout the arresting bed are critical and, so far as is known, the production of cellular concrete of appropriate characteristics and uniformity has not previously been achieved or described. Production of structural concrete for building purposes is an old art involving relatively simple process steps. Production of cellular concrete, while generally involving simple ingredients, is complicated by the nature and effect of aeration, mixing and hydration aspects, which must be closely specified and accurately controlled if a uniform end product, which is neither too weak nor too strong, is to be provided for present purposes. Discontinuities, including areas of weaker and stronger cellular concrete, may actually cause damage to the vehicle that is being decelerated if, for example, deceleration forces exceed wheel support structure strength. Such non-uniformity also results in an inability to accurately predict deceleration performance and total stopping distance. In one recent feasibility test utilizing commercial grade cellular concrete, an aircraft instrumented for recording of test data taxied through a bed section and load data was acquired. Even though steps had been taken to try to provide production uniformity, samples taken and aircraft load data from the test arresting bed showed significant variations between areas where the crush strength was excessively high and areas where it was excessively low. Obviously, the potential benefit of an arresting system is compromised, if the aircraft is exposed to forces that could damage or collapse the main landing gear.

A 1995 report prepared for the Federal Aviation Administration entitled "Preliminary Soft Ground Arrestor Design for JFK International Airport" describes a proposed aircraft arrestor. This report discusses the potential for use of either phenolic foam or cellular concrete. As to phenolic foam, reference is made to the disadvantage of a "rebound" characteristic resulting in return of some energy following compression. As to cellular concrete, termed "foamcrete", it is noted that "a constant density (strength parameter) of foamcrete is difficult to maintain" in production. It is indicated that foamcrete appears to be a good candidate for arrestor construction, if it can be produced in large quantities with constant density and compressive strengths. Flat plate testing is illustrated and uniform compressive strength values of 60 and 80 psi over a five to eighty percent deformation range are described as objectives based on the level of information then available in the art. The report thus indicates the unavailability of both existing materials having acceptable characteristics and methods for production of such material, and suggests on a somewhat hypothetical basis possible characteristics and testing of such materials should they become available.

Thus, while arresting bed systems have been considered and some actual testing of various materials therefor has been explored, practical production and implementation of either an arresting bed system which within specified distances will safely stop aircraft of known size and weight moving at a projected rate of speed off of a runway, or of materials suitable for use therein, have not been achieved.

The amount of material, and the geometry in which it is formed to provide an effective arresting bed for vehicles of a predetermined size, weight, and speed, is directly dependent upon the physical properties of the material and, in particular, the amount of drag which will be applied to the vehicle as it moves through the bed crushing or otherwise deforming the material. Computer programming models or other techniques may be employed to develop drag or deceleration objectives for arresting beds, based upon the calculated forces and energy absorption for aircraft of particular size and weight, in view of corresponding landing gear strength specifications for such aircraft. However, the models must assume that the arresting bed is constructed of a material having a section to section and batch to batch uniformity of characteristics, such as strength, durability, etc., to produce uniform results with a predictable amount of energy absorption (drag) when contacted by the portions of the aircraft (or other vehicle) which are bearing the load of the vehicle through the bed (e.g., the wheels of an aircraft as it moves through the bed after having overrun the runway).

One of the potential benefits of the use of foamed or cellular concrete in arresting bed systems is that the material itself is capable of being produced in a variety of different ways using numerous different starting materials. For prior types of applications not related to vehicle deceleration the concrete has been produced by using a particular type of cement (usually Portland) which is combined with water, a foaming agent, and air to produce a cellular concrete. However, a significant distinguishing requirement separates such prior applications of cellular concrete from production of a product suitable for use in an arresting bed. In prior applications, the objectives are typically reduced weight or cost, or both, while providing a predetermined minimum strength with the more strength the better. Prior applications have typically not required that cellular concrete be produced to strict standards of both maximum strength and minimum strength. Also, prior applications have not required a high degree of uniformity of material, provided basic strength objectives are met. Even for prior applications of cellular concrete, it is known that the amount and type of cement, the water/cement ratio, the amount and type of foaming agent, the manner in which the materials are combined, processing conditions and curing conditions can all have critical effects on the resulting properties of the cellular concrete. No necessity to refine production to the levels required to produce cellular concrete suitable for vehicle arresting beds has been presented by prior applications.

Thus, it is one thing to specify objectives as to the mechanical properties of materials appropriate to obtain the desired deceleration on entry of an airplane or other vehicle into the arresting bed. However, the capability of consistently producing cellular concrete material which will actually have the required properties of predetermined strength and uniformity is not known to have been previously achieved.

One substantial problem in the art is the lack of established techniques for production of cellular concrete in the low strength range, in a uniform fashion to very tight tolerances, to enable construction of an entire arresting bed consistently having the desired mechanical properties throughout its geometry.

Objects of the invention are to provide new and improved vehicle arresting units and methods for their production which provide one or more of the following characteristics and capabilities:

units produced in block form of sizes suitable for a variety of applications;

units produced to provide predetermined compressive gradient strength characteristics;

units having uniformity of characteristics suitable for safely arresting vehicle travel;

methods enabling repeatable production with predetermined characteristics;

methods enabling production control based on established parameter ranges; and methods enabling a high level of quality control in production of cellular concrete having predetermined compressive gradient strength suitable for a variety of applications.

SUMMARY OF THE INVENTION

In accordance with the invention, a vehicle arresting unit comprises a vehicle arresting block fabricated to provide a non-rebound compressive gradient strength effective to slow travel of a vehicle wheel without failure of an associated wheel support structure. The block is fabricated of cellular concrete, preferably having a dry density in a range from 12 to 22 pounds per cubic foot, formed from a combination of a slurry of water and cement having a temperature not exceeding 89 degrees F., a foam prepared from water and a foaming agent, and a curing form. The curing form is arranged to provide three-dimensional support with controlled evaporation for a mixture of the slurry and foam which are admixed after the slurry has undergone a temperature rise in a range of 5 to 12 degrees F. above its initial temperature. For purposes of the invention, a vehicle arresting block has a predetermined compressive gradient strength (CGS). For example a 60/80 CGS equal to about 70 psi, when averaged over a depth of penetration from 10 to 66 percent of block thickness.

Also in accordance with the invention, a method of forming a section of arresting material, characterized by a compressive gradient strength effective to provide limited deceleration of a moving object, such as an aircraft, includes the steps of:

(a) forming a slurry of cement and water, including inducing high-shear mixing of the slurry;

(b) permitting the slurry to undergo a hydration related temperature rise in a range of 5 to 12 degrees F., to reach a slurry temperature not exceeding 89 degrees F.;

(c) preparing a foam from water and a foaming agent;

(d) admixing the slurry and foam to provide cellular concrete;

(e) placing a portion of the cellular concrete in a form representative of the shape of the section; and (f) curing the cellular concrete under controlled evaporative conditions to provide the section of arresting material in a self-supporting three-dimensional shape and having a dry density in a range of 12 to 22 pcf.

For a better understanding of the invention, together with other and further objects, reference is made to the accompanying drawings and the scope of the invention will be pointed out in the accompanying claims.

DETAILED DESCRIPTION OF THE INVENTION

The use of cellular concrete in arresting bed applications requires the material to be generally uniform in its resistance to deformation since it is the predictability of resistive forces acting on the surface of contacting members of the vehicle which is being decelerated that allows the bed to be designed, sized and constructed in a manner which will ensure acceptable performance. In order to obtain such uniformity, there must be careful selection and control of the ingredients used to prepare the cellular concrete, the conditions under which it is processed, and its curing regime.

The ingredients of cellular concrete are generally a cement, preferably Portland cement, a foaming agent, and water. Relatively fine sand or other materials can also find application in some circumstances, but are not used in presently preferred embodiments. In addition to common types of materials used in various concrete applications, in accordance with the invention hollow glass or ceramic spheres, or other crushable materials may be embedded in cellular concrete. The currently preferred type of cement for arresting bed application is Type III Portland cement. For present purposes, the term "cellular concrete" is used as a generic term covering concrete with relatively small internal cells or bubbles of a fluid, such as air, and which may include sand or other material, as well as formulations not including such sand or other material.

Numerous foaming agents as known and used in the cellular concrete industry are classified as either natural or synthetic foams. Natural foams are generally considered to be more robust in the sense that they will not breakdown as quickly as synthetic foams. On the other hand, synthetic foams are generally more uniform in quality and therefore more predictable in performance. While either type of foam can be used, it is presently preferred to use a synthetic foam with suitable foaming and setting characteristics because consistency and uniformity of the resulting cellular concrete is of primary concern in the arresting bed application.

There are many known methods for producing cellular concrete. In general the process includes the steps of mixing the foam concentrate with water, generating foam by inducing air, adding the resulting foam to the cement slurry or cement/aggregate slurry mix, and thoroughly blending the foam and cement slurry in a controlled manner that results in a homogeneous mixture with a significant amount of voids or "cells" which keep the density of the material relatively low as compared to other types of concrete. Because the application of cellular concrete to arresting bed applications requires a general uniformity of material properties, uniform foaming, mixing, and setting of the materials is of extreme importance.

The preferred method of producing the cellular concrete is to use a process that approximates a steady state, continuous process as closely as possible. By controlling pressures, mixing speeds, temperatures of raw materials and other processing variables to be as constant as possible, higher levels of uniformity of cellular concrete product are attainable and variations usually associated with batch processing are avoided. Nevertheless, the amount of material produced at any one time in a batch process or otherwise will dictate how long the process is run and how close an approximation to "steady-state" like operation is practical under the circumstances of production for a particular arresting bed installation.

The preferred process includes the steps of creating a cement slurry, creating the foam, and then admixing the cement slurry and foam to form the foamed or cellular concrete. The foam is prepared by admixing the foam concentrate with water to form a foaming solution. By way of example, a preferred ratio of water to foam concentrate for the above noted synthetic foam material such as referenced above is about 39:1 on a volume basis. Next, the foam is formed by any suitable means of air entrapment, such as, for example, passing the foam solution through a pump fitted with an adjustable air inlet. Preferably the foam density produced by this process step will be from about 2.2 to about 2.6 lbs./cu. ft., and more preferably from about 2.3 to about 2.4 lbs./cu. ft. As used herein, pounds per cubic foot is abbreviated as either "lbs./cu.ft." or "pcf".

In accordance with the invention, the cement slurry is produced by admixing water with the Type III Portland cement. Preferred ratios of water to cement have been found to be in the range of from about 0.5 to about 0.7, with a ratio of 0.54 found to provide excellent results. The cement is initially mixed with the water and it has been found to be particularly advantageous to impart very high shear to the slurry. Passing the mixture through a high shear pump is the presently preferred way of imparting high shear to the cement slurry. It is preferred that ambient temperatures during preparation of the cellular concrete be at least about 65° F. As used herein, Fahrenheit is abbreviated as "F".

It has also been determined that the preferred process includes allowing sufficient partial hydration time for the cement slurry prior to admixing it with the foam to form the foamed concrete. While partial hydration times may vary given different cements and cement/water ratios, some amount of hydration of the slurry, for example, as it is cycled through a shear imparting device, has been found to aid in obtaining acceptable final product. Since the hydration reaction releases heat into the slurry, one measure of hydration is a rise in temperature. Thus, it has been found to be particularly effective to mix the water and cement long enough to provide a hydration related temperature rise of about 5 to about 12 degrees F. In a preferred embodiment, a time period of about four minutes is utilized, to provide a hydration related temperature rise within a range of 6 to about 8 degrees F., before introducing the foam into the cement slurry. For example, a high speed pump can be fitted with temperature sensors and the mixing of the cement slurry can be performed in a recycling fashion until the noted hydration related temperature rise (and hence, appropriate level of hydration for present purposes) has occurred. The partially hydrated cement slurry can then be passed to a low shear or relatively gentle mixing environment, such as a paddle mixer, where the foam is combined to form the cellular concrete.

The wet densities of the foam concrete must be very closely controlled if the necessary uniformity of product is to be obtained. Preferred wet densities are from about 14 to about 23 lbs./cu. ft. A presently preferred wet density which has been used to obtain a specified compressive gradient strength or "CGS" (as defined below) of about 60/80 CGS, is about 18 lbs./cu. ft.

Figure 6:
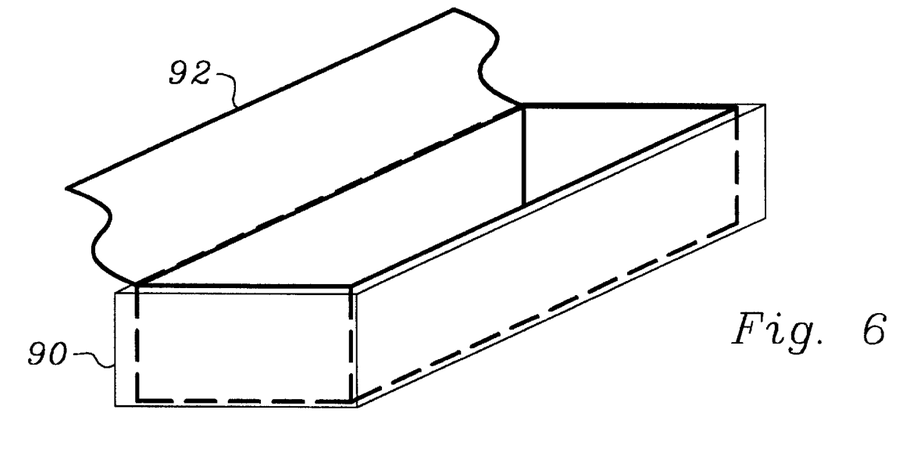
FIG. 6 illustrates a controlled evaporation curing form for use in accordance with the invention.

The foamed concrete should be allowed to cure in a manner that will reduce water loss rates. Preferably, only the self desiccating effects of curing will be responsible for the majority of water loss. This can be accomplished by casting sections of cellular concrete in wooden forms lined with a plastic sheeting material which also extends on top of the cellular concrete. FIG. 6 is a simplified illustration of an open top wooden form 90 suitable for use in methods in accordance with the invention. Form 90 may typically have respective inner length and width dimensions of 8 by 4 feet and an internal height appropriate for the particular thickness of block to be fabricated using the form. As shown, a plastic liner 92, covering internal surfaces and having a cover portion or portions to overlay the top surface of cellular concrete introduced into the form, is included and positioned within form 90. The combination of form 90 and a liner 92 of plastic or other suitable material enable provision of controlled evaporation conditions during the curing period for arresting blocks produced in accordance with the invention. Preferable curing conditions include ambient temperatures that are near room temperature (about 70 degrees Fahrenheit). The curing process will vary with the materials and mix but normally is completed in about 21 days.

Construction of an arresting bed system can be accomplished by producing the cellular concrete at a central production facility or at the site of the bed and pouring the concrete into forms of appropriate dimensions to achieve the desired geometry for the system. However, in the interests of uniformity of material characteristics and overall quality control, it has been found preferable to cast sections of the overall bed using forms of appropriate size and then transport the sections to the site and install them to form the overall configuration of the bed. In the latter case, such units or sections, in the form of blocks of predetermined sizes, can be produced and held until completion of quality control testing. The blocks can then be placed at the site and adhered to the runway safety area using asphalt, cement grout, or other suitable adhesive material, depending on the construction materials of the safety area itself.

In either case, a hardcoat material is preferably applied to the exposed surfaces of each block of the assembled arresting bed to provide a stronger surface that is not as easily deformed as the major structure of the bed itself, allowing maintenance to be performed without serious deformation damage to the main structure. A preferred hardcoat material comprises foamed concrete wherein the wet density is somewhat higher, for example in the range of about 22 to about 26 lbs./cu. ft.

Figure 1A:
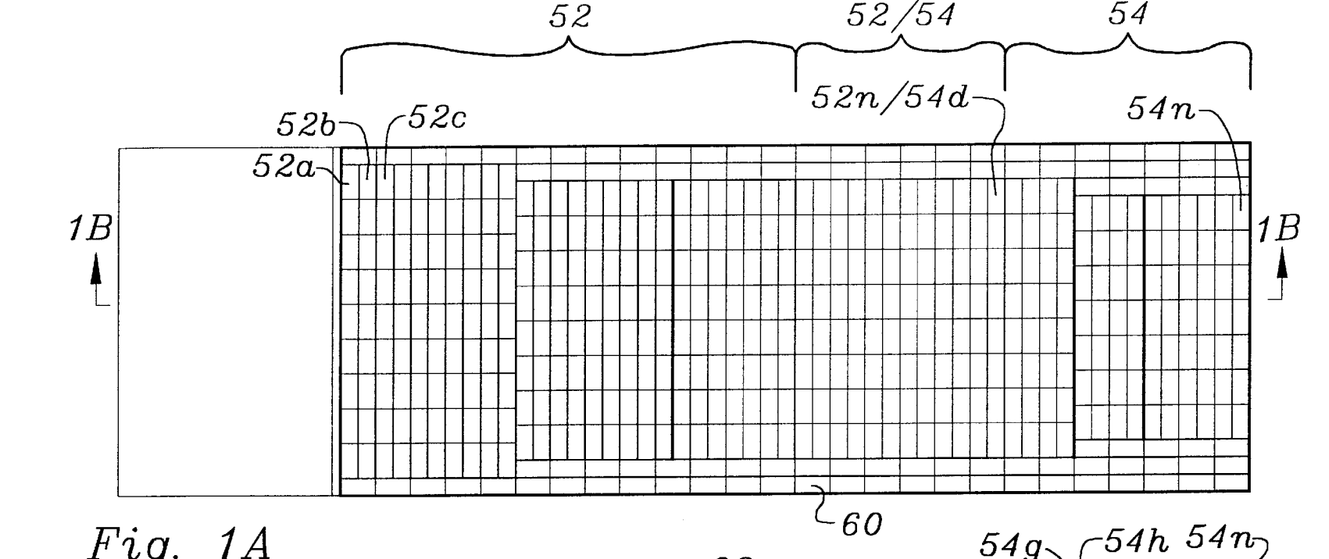
FIGS. 1A, 1B and 1C are respectively a plan view, longitudinal and transverse and cross-sectional views of a vehicle arresting bed system.
Figure 1B:
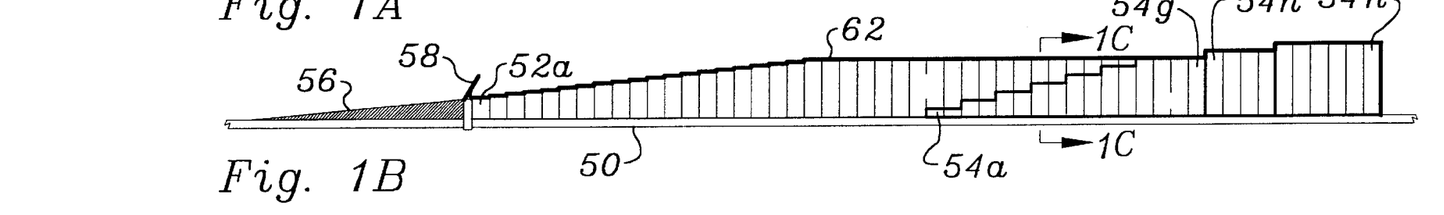
Figure 1C:
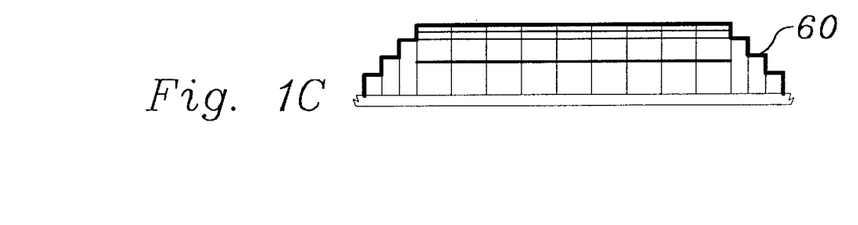

In order to provide greater context for description of arresting blocks in accordance with the invention, an example of a complete arresting bed system utilizing such blocks is illustrated in FIGS. 1A, 1B and 1C. As shown, the arresting bed basically includes a first section 52 assembled of lateral rows of arresting blocks of a first compressive gradient strength (e.g., a 60/80 CGS) and a section 54 assembled of rows of arresting blocks of a higher compressive gradient strength. In the embodiment shown an initial row of arresting blocks has a thickness or height of 9 inches, with subsequent rows increasing in height by ¾ inch increments. Certain successive rows of arresting blocks in section 54 have incremental height differences of 3 inches. The combination of incrementally increasing height and different CGS provide an increasing drag effect for deceleration of an aircraft entering the arresting bed. The arresting bed will be described in greater detail below.

Figure 2:
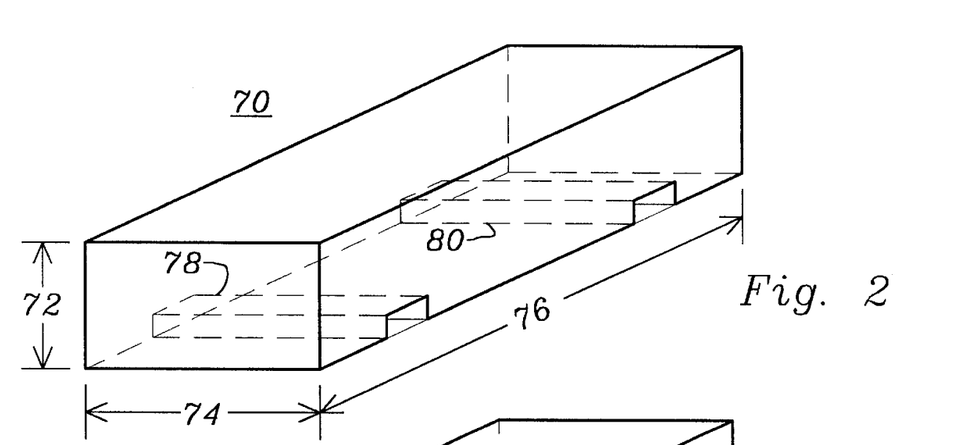
FIG. 2 shows a form of deceleration block of cellular concrete utilizing the invention.

With reference to FIG. 2, there is illustrated an example of a vehicle arresting or deceleration block 70 formed of cellular concrete in accordance with the invention. Block 70 is suitable for uses such as vehicle arresting bed systems installed at the end of airport runways to arrest travel of an aircraft overrunning the end of the runway, as well as similar types of installations to stop trucks or other vehicles. In other applications, blocks or other units of cellular concrete of various sizes and configuration are usable to arrest motion of various types of moving projectiles and other objects.

As shown in FIG. 2, vehicle arresting block 70 generally has a height or thickness 72 which is less than a vehicle body clearance of a vehicle to be decelerated. Block 70 may thus be positioned in the path of a vehicle, such as an aircraft, which is to be decelerated, with the objective of interacting with the landing gear (e.g. wheels) of the aircraft, without coming directly into contact with the fuselage. As an exception to the foregoing, where use is intended to be provided for a variety of large and small aircraft, it may not be possible to ensure fuselage clearance for smaller aircraft because of the need to provide desired deceleration capability for larger aircraft. Pursuant to the invention, block 70 is fabricated to provide a non-rebound compressive gradient strength effective to decelerate or slow travel of a vehicle wheel. An important, but secondary objective is to accomplish that without resulting in failure of an associated aircraft nose wheel support structure, if possible. To meet these objectives, block 70 comprises a pre-cured free-standing block of concrete having a dry density in a range from 12 to 22 pounds per cubic foot (pcf). For use in assembling a typical aircraft arresting bed, such as illustrated in FIGS. 1A, 1B and 1C, blocks of cellular concrete may be fabricated in the form shown in FIG. 2 with a uniform width 74 (nominally 4 feet) and length 76 (nominally 8 feet) and a thickness 72 (typically 9 to 30 inches) which may vary in increments (typically of ¾ to 3 inches) in order to enable provision of front to rear tapered bed configurations able to provide predetermined incremental increases in drag forces.

As illustrated in FIG. 2, arresting block 70 includes two transverse slots 78 and 80 configured to facilitate handling and placement of the block. In a presently preferred embodiment, two plastic sleeves 4 feet in length and each having a rectangular opening approximately 1.5 inches high by 4 inches wide are positioned on the inside bottom surface of a curing form before a cellular concrete slurry is introduced into the form. In this embodiment the sleeves are thus molded into the block and remain embedded in the bottom of the resulting arresting block when it is removed from the form after curing is completed. The plastic sleeves are of inexpensive construction and need only be strong enough to avoid collapse during introduction and curing of the cellular concrete in the form. When cured, the resulting arresting block 70 includes the two transverse slots 78 and 80 structurally formed into the block. It will be appreciated that a relatively light weight cellular concrete block, which may have dimensions of 4×8 feet by 8 inches in thickness, will be a relatively fragile structure, in so far as handling, movement and placement of the block. That is to say, that attempting to pick up the block without requisite care may tend to cause cracking or fracture of the block. In accordance with the invention, the breakage problem is greatly reduced while permitting the blocks to be readily moved and placed in an arresting bed. Slots 78 and 80 are respectively located typically about one-sixth of the block length in from each end. Then a forklift type vehicle or apparatus having two approximately sized and spaced protrudances which can be inserted into slots 78 and 80 can be readily employed to lift, move and transport a block from one position to another. A variety of other arrangements, such as use of raised ridge portions which remain in the form, may be employed to provide suitable transverse slots comparable to slots 78 and 80.

More particularly, block 70 comprises cellular concrete formed from a combination including:

a slurry of water and cement, typically in a ratio range from 0.5:1 to 0.6:1;

a foam prepared from water and a foaming agent, typically having a density in range of 2.2 to 2.6 pcf; and a curing form arranged to provide three-dimensional support with controlled evaporation for a slurry and foam admixture having a wet density in a range of 14 to 23 pcf.

Such combination is effective in providing a deceleration block of cellular concrete having a continuous compressive gradient strength in a range of 40 to 140 psi over at least 60 percent of its thickness. The specific compressive gradient strength for a particular block may be selected or specified within a much narrower range, as appropriate for a particular application, by more particularly specifying the particular parameters within the stated ranges.

In order to enable fabrication of vehicle arresting blocks having specified and repeatable compressive gradient strengths for particular applications and a high degree of uniformity of such strength throughout the cellular concrete forming the block, deceleration blocks and more particularly vehicle arresting blocks are desirably formed from materials meeting the following specifications. The slurry of water and cement has been subjected to high-shear mixing and permitted to undergo a hydration related temperature rise in the range of 5 to 12 degrees Fahrenheit (F) to reach a temperature not exceeding 89 degrees F., prior to admixture with the foam. In a presently preferred method a hydration related temperature rise in a range of 6 to 8 degrees F. is utilized in reaching a maximum pre-admixture temperature not exceeding 87 degrees F.

Figure 3:
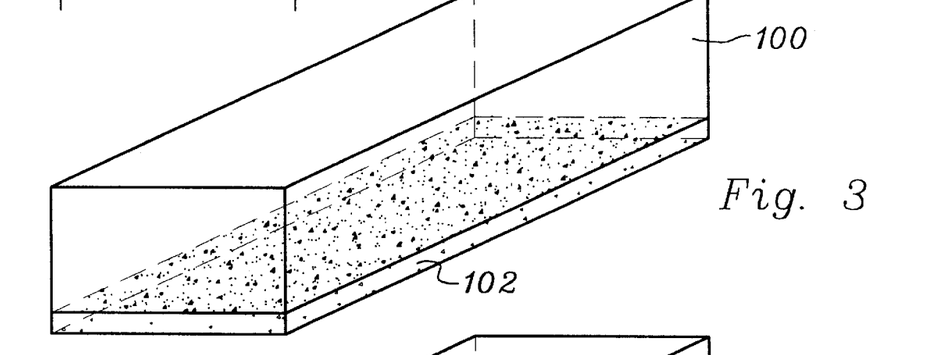
FIGS. 3, 4 and 5 show alternative constructions of deceleration blocks in accordance with the invention.
Figure 4:
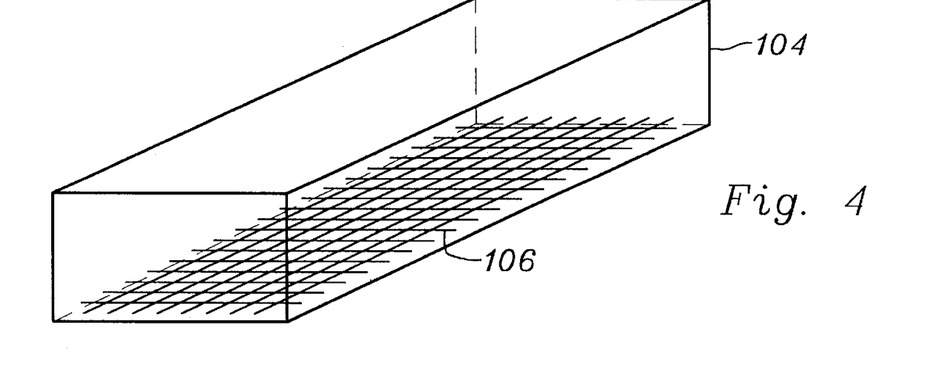
Figure 5:
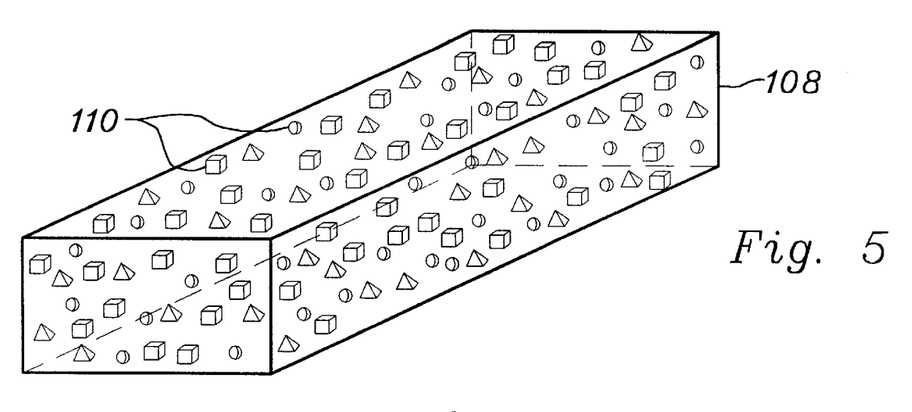

FIGS. 3, 4 and 5 illustrate particular embodiments of cellular concrete blocks usable in arresting bed systems pursuant to the invention. The block of FIG. 3 is a composite block including an upper portion 100 of cellular concrete having a desired CGS and a thin lower layer 102 of stronger cellular concrete or other material to provide added strength, particularly during block transport and installation. FIG. 4 shows a block of cellular concrete 104 which includes within its lower portion reinforcing members illustrated in the form of a strengthening grid of suitable fiber, metal or other material. In other embodiments, wires, rods or other configurations of suitable materials may be used. FIG. 5 illustrates a block 108 of cellular concrete containing within it crushable pieces or forms of other material. As represented in somewhat idealized form, such material may comprise one or more of: regular or irregular pieces of compressible material; glass or ceramic spheres; hollow items of selected material and shape; or other suitable pieces. These block configurations may be fabricated by placement of items into the casting forms or into the wet cellular concrete, so as to be embedded in a vehicle arresting block. It will be appreciated that items or materials added to the block will typically be positioned near the bottom of the block adjacent the ground surface (FIGS. 3 and 4) or distributed throughout (FIG. 5). Such items or materials will thus have minor effect in decelerating a vehicle or other object, be taken into account in determining CGS, or both.

It will be appreciated that while the prior art recognized, for example, the potential advantages of an aircraft arresting bed constructed of a foam material, no suitable formulation of cellular concrete was available. Thus, while cellular concrete was available for various uses requiring light weight and at least a minimum strength before material failure or collapse, characteristics of uniformity of strength and compressive failure strength within a narrow predictable range, and continuous over a range of thickness, were neither required nor achievable.

In accordance with the invention, a method of forming a section of arresting material, characterized by a compressive gradient strength effective to arrest motion of a moving object without destroying the object, includes the following steps:

(a) forming a slurry of cement and water, including projecting the slurry in a high force stream to induce high-shear mixing;

(b) permitting the slurry to undergo a hydration related temperature rise in a range of 5 to 12 degrees F., without exceeding a final slurry temperature of 89 degrees F.;

(c) preparing a foam from water and a foaming agent having a density in a range from 2.2 to 2.6 pcf;

(d) admixing the slurry and foam to provide cellular concrete;

(e) placing a portion of such cellular concrete in a form representative of the three-dimensional shape of the desired section; and (f) curing the cellular concrete under controlled evaporative conditions to provide the section of arresting material in a self-supporting three-dimensional shape and having a dry density in a range of 12 to 22 pcf.

By adjustment of the relevant parameters, which can be fine tuned on a results achieved basis, cellular concrete arresting blocks and other forms of deceleration blocks can be provided having uniformity and compressive gradient strengths appropriate for aircraft arresting bed systems and other uses. Typically, compressive gradient strengths in a range of 40 to 140 psi are appropriate for such purposes. Pursuant to the invention, it has been determined that cellular concrete fabricated to have a dry density in a range of 10 to 25 pcf is suitable for such purposes.

Definition of "Compressive Gradient Strength" or "CGS"

The term "compressive strength" (not CGS) is normally understood to mean the amount of force (conventionally measured in pounds per square inch) which, when applied at a vector normal to the surface of a standardized sample, will cause the sample to fail. Most conventional test methods specify test apparatus, sampling procedures, test specimen requirements (including size, molding, and curing requirements) rates of loading and record keeping requirements. An example is ASTM C 495-86 "Standard Method for Compressive Strength of Lightweight Insulating Concrete." While such conventional test methods are useful when designing structures that are required to maintain structural integrity under predicted load conditions (i.e., have at least a minimum strength), the object of arresting bed systems is to fail in a predictable specified manner, thereby providing controlled, predictable resistive force as the vehicle deforms the cellular concrete (i.e., a specific compressive gradient strength). Thus, such conventional testing focuses on determining strength up to a point of failure, not strength during compressive failure. Stated more simply, knowing what amount of force will shatter a specimen of cellular concrete material does not answer the critical question of what amount of drag or deceleration will be experienced by a vehicle moving through an arresting bed system. In contrast to a "one time" fracture strength as in the prior art, for present purposes testing must evaluate a continuous compressive failure mode as a portion of a specimen is continuously compressed to about twenty percent of its original thickness. Equipment and methods suitable for such continuous testing as appropriate for present purposes have generally not been previously available.

Because of the wide range of variables available in materials and processing of cellular concretes, and the size and cost of constructing arresting beds for testing, it is imperative that accurate test information be available to predict the amount of resistive force a particular variety of cellular concrete, processed and cured in a certain way, will provide when used in an arresting bed system. By developing new test methodology to focus the resulting data on measurement of the resistive force occurring during continuous compressive failure of a sample, instead of simple one-time "compressive strength", new test methods and apparatus have been developed to enable reliable testing and confirmation of appropriate cellular concrete materials and process variables.

As a result, it has been determined that the compressive force needed to crush cellular concrete to 20 percent of its original thickness varies with the depth of penetration. This characteristic, which the present inventors term "compressive gradient strength" or "CGS" must be accurately specified in order to construct a cellular concrete vehicle arresting bed having known deceleration characteristics to safely slow an aircraft. Thus, a penetration type test method where the compressive strength of a sample of cellular concrete is gauged not by applying a force that will fracture a sample, but rather will continuously report information on resistive forces generated as a test probe head having a specified compressive contact surface is moved through a volume of cellular concrete, is key to obtaining the data necessary to formulate and use cellular concrete in arresting bed applications. As thus measured, CGS will vary over a range with penetration depth, resulting in a gradient value (such as 60/80 CGS) rather than a simple singular fracture value as in prior tests.

For present purposes, the term "compressive gradient strength" (or "CGS") is used to refer to the compressive strength of a section of cellular concrete from a surface and continuing to an internal depth of penetration which may typically be 66 percent of the thickness of the section. As defined, CGS does not correspond to compressive strength as determined by standard ASTM test methods.

Figure 7:
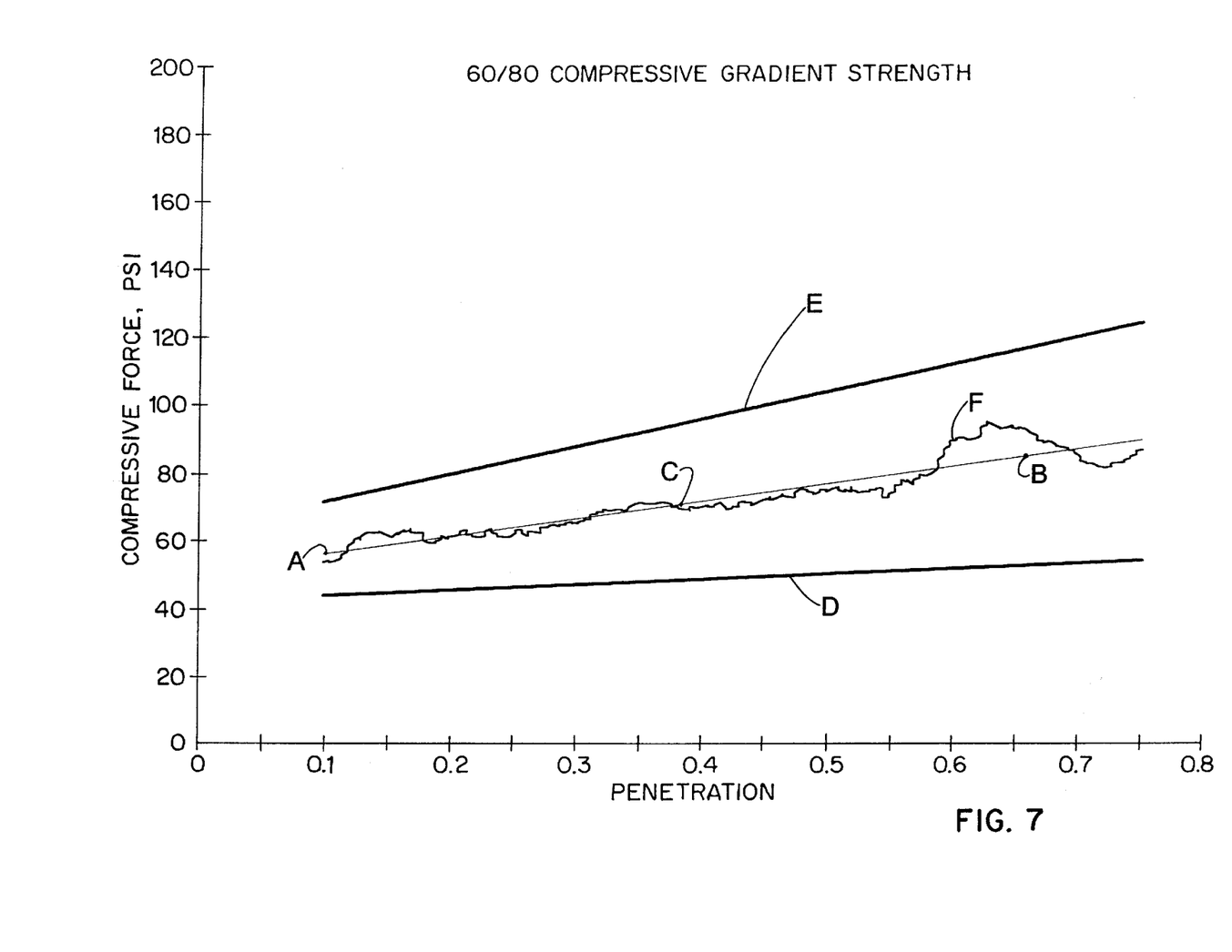
FIGS. 7 and 8 show test results in terms of compressive force versus percentage of penetration for samples of cellular concrete of two different strengths.

FIG. 7 illustrates the CGS characteristics of a cellular concrete sample representative of a block from section 52 of FIG. 1, as determined by test. In FIG. 7, the bottom scale represents percentage of test probe penetration expressed in tenths of sample thickness or height. The vertical scale represents test probe compressive force expressed in pounds per square inch (psi). The test data of interest is typically within the range of penetration from 10 to 66 percent of sample thickness. Data outside this range may be less reliable, with crushed material build-up effects occurring beyond about 70 percent penetration.

Figure 8:
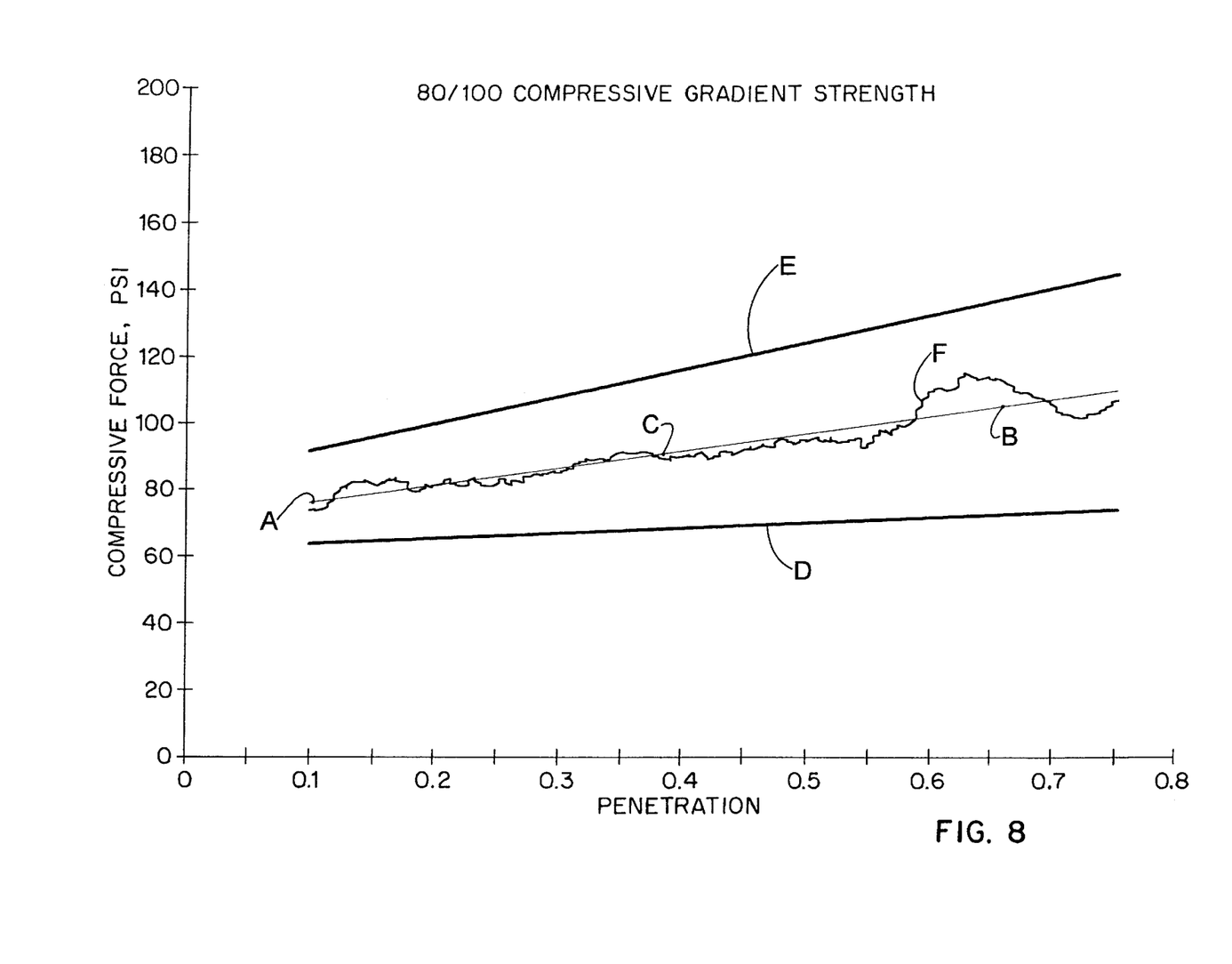

As illustrated in FIG. 7, the failure strength of cellular concrete exhibits a gradient with resistance to compression increasing with depth of penetration. The line through points A and B in FIG. 7 represents a generalized 60/80 CGS, i.e., a CGS characterized by a compression strength changing from approximately 60 psi to approximately 80 psi over a 10 to 66 percent penetration range. The average, over this range is thus nominally equal to 70 psi at mid-point C. Lines D and E represent quality control limits and line F represents actual test data as recorded for a specific test sample of cellular concrete. In this example, a test sample for which test data over a 10 to 66 percent penetration range remains within quality control limit lines D and E, represents an arresting block fabricated within acceptable tolerances. FIG. 8 is a similar illustration of CGS characteristics of decelerating block with an 80/100 CGS which is nominally equal to 90 psi, when averaged over a selected depth of penetration (e.g., a 10 to 66 percent penetration range). For present purposes, "nominal" or "nominally" is defined as referring to a value or relationship which is within about plus or minus 15 percent of a stated value or relationship. Test methods and apparatus suitable for determining CGS are disclosed in U.S. Pat. No. 5,789,681 filed concurrently herewith, having a common assignee, and hereby incorporated herein by reference.

Arresting Bed of FIGS. 1A, 1B and 1C

With reference to FIG. 1 (collectively including FIGS. 1A, 1B and 1C), there is illustrated an embodiment of a vehicle arresting bed system utilizing arresting units as described above. Basically, the FIG. 1 system is constructed of pre-cast blocks of cellular concrete having two different compressive gradient strengths and a variety of different thicknesses, with intended installation at the end of an airport runway. Subsurface 50 supporting the system should typically be relatively flat, smooth and level (subject to having a slope appropriate for water runoff requirements) and capable of supporting aircraft which leave the runway. Subsurface 50 should be in good condition and cleaned satisfactorily for placement and bonding of the arresting bed system. To show vertical details, the vertical dimensions of FIGS. 1B and 1C are expanded relative to the dimensions of FIG. 1A (e.g., the width of the bed in FIG. 1A may typically be 150 feet, while the maximum thickness of the bed in FIGS. 1B and 1C may typically be 30 inches). Also, certain dimensions, such as block size, are distorted for clarity of illustration (e.g., rather than show the thousands of blocks actually included in a typical arresting bed).

As shown, the FIG. 1 vehicle arresting bed system includes a first section 52, comprising an assembly of blocks having a first CGS and a first dry density, and a second section 54, comprising an assembly of blocks having a second CGS and a second dry density. As shown in the side sectional view of FIG. 1B, sections 52 and 54 partially overlap (in what might be considered section 52/54), with a darkened line indicating the juncture wherein certain blocks of section 52 overlie blocks of section 54 in a transition region. In a particular embodiment, the section 52/54 blocks may actually be composite blocks (i.e., single blocks including a 52 portion having a first CGS and also a 54 portion having a second CGS). In other embodiments separate blocks of different CGS may be stacked for section 52/54.

More particularly, vehicle arresting bed systems of the type illustrated in FIG. 1 include at least a first lateral row of blocks (e.g., row 52a) of cellular concrete having a first dry density in a range of 13 to 18.5 pounds per cubic foot (pcf). Each of the blocks in first row 52a has a first height and is fabricated to be vertically compressible to a compressed height (e.g., typically about 80 percent of initial thickness). These blocks may be fabricated to exhibit a 60/80 CGS characteristic as represented in FIG. 7. As shown in FIGS. 1A and 1B, the first section 52 includes a plurality of additional lateral rows illustrated as rows 52b through 52n, formed of cellular concrete having the same basic characteristics as in the blocks of row 52a, but some of which differ row-to-row by an incremental height differential. Also, as discussed with reference to overlap section 52/54 certain rows of blocks, such as row 52n, overlay blocks of row 54d on a composite block or stacked block basis. In this embodiment successive ¾ inch changes in thickness were utilized in section 52 to provide tapered or sloping characteristics resulting in gradually increasing vehicle arresting capabilities. Corresponding 3 inch changes in thickness were utilized in section 54, in this particular design.

Arresting bed systems of the type illustrated also include at least one lateral row 54g of blocks of cellular concrete having a second dry density which may be at a higher level in the same range as the blocks in section 52. As shown, lateral row 54g is positioned parallel to and to the rear of the first lateral row 52a. Row 54g is in turn followed by a lateral row 54h of incrementally greater height. The blocks of section 54 are fabricated to be vertically compressible subject to a second compressive gradient strength, which will generally be specified to exceed the CGS of the blocks of section 52. These blocks may be fabricated to exhibit an 80/100 CGS characteristic as represented in FIG. 8 and a dry density in a range of 16 to 21.5 pcf. In the illustrated embodiment the first row of blocks 54a of section 54 includes only a single course or layer of the second CGS. Successive rows of section 54 include increasing thickness of the second CGS material, until the section 54 blocks reach the full height of the arresting bed beyond section 52. Successive rows of section 54 then increase in thickness by 3 inch increments in advance of reaching full height in a rear level portion comprising rows of the same thickness continuing to final rear row 54n. Rows of increased height, such as row 54n, may be formed of two or three superimposed blocks of reduced thickness or of rows of single relatively thick blocks, depending upon fabrication, handling and site delivery considerations.

As shown, the FIG. 1 system further includes an inclined entrance ramp 56 positioned across the vehicle entrance front side of the first lateral row 52a. The ramp, which may be formed of asphalt mix or other permanent type material, tapers up to a height adjacent the blocks of row 52a, which is typically greater than the compressed height of the blocks of row 52a. In a particular embodiment, a 3 inch ramp height was used adjacent to 9 inch blocks having an estimated minimum compressed height of 1.8 inches. Ramp 56 is thus effective to gradually raise an aircraft above general runway level, so that the aircraft can enter the arresting bed on a relatively smooth basis as the wheels leave ramp 56 and begin compressing the blocks of row 52a. Also included in the FIG. 1 system is a hardcoat layer 62, in the form of a relatively thin protective layer of cellular concrete material, overlaying the blocks of both section 52 and section 54 (represented by the uppermost boundary of the bed in FIG. 1B). In a preferred embodiment, hardcoat layer 62 comprises a relatively thin layer of cellular concrete having a higher dry density (sufficient to support persons walking on the arresting bed, for example) and may be covered by a weather resistant paint or similar coating. Layer 62 is applied over the arresting bed after all blocks of sections 52 and 54 are positioned and appropriately adhered to supporting surface 50.

As illustrated, the arresting bed system also has associated with it a debris shield 58 and service vehicle entrance ramps 60. Shield 58 may be formed of relatively light weight aluminum sheet stock adequate to deflect particles blown by jet exhaust, etc., but fragile enough to readily yield to the tires of an aircraft. Ramps 60 are proportioned and constructed to enable airport fire or rescue vehicles to drive up onto the arresting bed in order to provide assistance to passengers of an aircraft which has come to a stop within the boundaries of the arresting bed. Ramps 60 may be constructed of cellular concrete of appropriate strength or other suitable material.

In a typical arresting bed installation, appropriate for arresting travel of a variety of types of aircraft, the blocks of section 52 may typically have thicknesses varying in ¾ inch increments from 8 inches to 24 inches, and provide a 60/80 CGS averaging 70 psi over a depth of penetration, as described above. The blocks of section 54 may correspondingly have thicknesses varying in three inch increments from 24 inches to 30 inches, and provide an 80/100 CGS averaging 90 psi over a depth of penetration. In fabrication of the blocks, the blocks of section 52 may be formulated from cellular concrete having a wet density toward the lower portion of a range of about 14 to 23 pcf, with the blocks of section 54 fabricated from cellular concrete having a wet density toward the upper portion of such range. The composite blocks in section 52/54 would correspondingly consist partially of 60/80 CGS material and partially of 80/100 CGS material. Overall, sections 52 and 54 may have an aggregate length of 400 feet, a width of 150 feet and front end and rear end thicknesses of 9 inches and 30 inches, respectively. It will be appreciated that for any particular implementation of the invention, performance achieved will be dependent upon the characteristics of the materials and arresting system design as specified and fabricated in order to meet identified site-specific performance objectives. Parameters relating to materials or systems for any specific implementation are beyond the scope of present purposes and specific values are discussed only as general examples of possible parameter magnitudes.

The nature of a cellular concrete arresting bed system is such that its construction will inherently be relatively time consuming and expensive. Therefore, it is important that the method and information used to design the system be reliable enough to correlate with and predict performance under actual conditions of use. The present invention enables the fabrication of vehicle arresting blocks suitable for use in aircraft arresting bed systems and automotive roadway and raceway applications, as well as other forms of deceleration blocks suitable for a variety of other object deceleration purposes and applications.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method of forming a section of arresting material, characterized by a compressive gradient strength effective to provide limited deceleration of a moving object, comprising the steps of:
    (a) forming a slurry of cement and water;
    (b) permitting said slurry to undergo a hydration related temperature rise in a range of 5 to 12 degrees F., to reach a slurry temperature not exceeding 89 degrees F.;
    (c) preparing a foam from water and a foaming agent;
    (d) admixing said slurry and said foam to provide cellular concrete;
    (e) placing a portion of said cellular concrete in a form representative of the shape of said section; and
    (f) curing said cellular concrete under controlled evaporative conditions to provide said section of arresting material in a self-supporting three-dimensional shape suitable to provide deceleration of a moving object.

2. A method as in claim 1, wherein step (a) includes projecting said slurry in a stream to induce high-shear mixing.

3. A method as in claim 1, wherein in step (a) said slurry is formed from water and cement in a ratio range from 0.5:1 to 0.6:1.

4. A method as in claim 1, wherein in step (b) said slurry undergoes a hydration related temperature rise in a range of 6 to 8 degrees F.

5. A method as in claim 1, wherein in step (d) said cellular concrete has a wet density in a range of 14 to 23 pcf.

6. A method as in claim 1, wherein step (e) comprises placing said portion in a wooden form having a plastic liner and cover portions.

7. A method as in claim 1, wherein in step (f) said cellular concrete as cured has a dry density of 12 to 22 pcf.

8. A method as in claim 1, wherein in step (f) said cellular concrete as cured has a predetermined compressive gradient strength over a depth of penetration from 10 to 66 percent of its thickness.

9. A method of forming a deceleration block, usable to provide limited deceleration of a moving object, comprising the steps of:
    (a) forming a slurry of cement and water;
    (b) permitting said slurry to undergo a hydration related temperature rise in a range of 5 to 12 degrees F.;
    (c) preparing a foam from water and a foaming agent;
    (d) admixing said slurry and said foam to provide cellular concrete; and
    (e) placing a portion of said cellular concrete in a form suitable to provide said deceleration block in a shape and size suitable for use in decelerating a moving object.

10. A method as in claim 9, additionally comprising the step of:
    including within said form sleeve members arranged to define transverse slots in said block, said slots configured to facilitate non-destructive lifting of said block.

11. A method as in claim 9, additionally comprising the step of:
    including within said form crushable pieces of a material other than cellular concrete.

12. A method as in claim 9, additionally comprising the step of:
    including within said form one of: hollow glass spheres; hollow ceramic spheres; hollow items of selected material and shape.

13. A method as in claim 9, additionally comprising the step of:

including within said form a layer of cellular concrete material of higher strength than said cellular concrete of step (d) will have after curing.

14. A method as in claim 9, additionally comprising the step of:

including within the lower portion of said form one or more reinforcing members positioned so as not to interfere with compressive failure of said block to a depth of penetration of 80 percent of block thickness.

15. A method as in claim 9, additionally comprising the step of:

including within the lower portion said form reinforcing members in the form of a grid of one of: wires; rods; fibers; other suitable material; said grid positioned so as not to interfere with compressive failure of said block to a depth of penetration to 80 percent of block thickness.

16. A method as in claim 9, wherein step (a) includes projecting said slurry in a stream to induce high-shear mixing.

17. A method as in claim 9, wherein in step (b) said slurry undergoes a hydration related temperature rise in a range of 6 to 8 degrees F.

18. A method as in claim 9, wherein in step (d) said cellular concrete has a wet density in a range of 14 to 23 pcf.

19. A method as in claim 9, wherein in step (e) said cellular concrete is cured and after curing has a dry density of 12 to 22 pcf.

20. A method as in claim 9, wherein in step (e) said cellular concrete is cured and after curing has a predetermined compressive gradient strength over a depth of penetration from 10 to 66 percent of its thickness.

21. A method of forming a deceleration block, usable to provide limited deceleration of a moving object, comprising the steps of:

(a) forming a slurry of cement and water;

(b) preparing a foam from water and a foaming agent;

(c) admixing said slurry and said foam to provide cellular concrete;

(d) placing a portion of said cellular concrete in a form suitable to provide said deceleration block in a shape and size suitable for use in decelerating a moving object; and (e) including within the lower portion of said form a layer of material of higher strength than said cellular concrete of step (c) will have after curing, said layer positioned so as not to interfere with compressive failure of said block to a depth of penetration of 80 percent of block thickness.

22. A method of forming a deceleration block, usable to provide limited deceleration of a moving object, comprising the steps of:

(a) forming a slurry of cement and water;

(b) permitting said slurry to undergo a hydration related temperature rise to reach a slurry temperature not exceeding 89 degrees F.;

(c) preparing a foam from water and a foaming agent;

(d) admixing said slurry and said foam to provide cellular concrete; and (e) placing a portion of said cellular concrete in a form suitable to provide said deceleration block in a shape and size suitable for use in decelerating a moving object.

23. A method as in claim 22, wherein in step (b) said slurry undergoes a hydration related temperature rise in a range of 5 to 12 degrees F.

24. A method as in claim 22, wherein in step (b) said slurry undergoes a hydration related temperature rise in a range of 6 to 8 degrees F.

25. A method as in claim 22, wherein in step (d) said cellular concrete has a wet density in a range of 14 to 23 pcf.

26. A method as in claim 22, wherein in step (e) said cellular concrete is cured and after curing has a dry density of 12 to 22 pcf.

27. A method as in claim 22, wherein in step (e) said cellular concrete is cured and after curing has a predetermined compressive gradient strength over a depth of penetration from 10 to 66 percent of its thickness.

28. A method as in claim 22, additionally comprising the step of:

including within said form a layer of cellular concrete material of higher strength than said cellular concrete of step (d) will have after curing.

29. A method of forming a deceleration block, usable to provide limited deceleration of a moving object, comprising the steps of:

(a) forming a slurry of cement and water and projecting said slurry in a stream to induce high-shear mixing;

(b) preparing a foam from water and a foaming agent;

(c) admixing said slurry and said foam to provide cellular concrete; and (d) placing a portion of said cellular concrete in a form suitable to provide said deceleration block in a shape and size suitable for use in decelerating a moving object.

30. A method as in claim 29, wherein in step (c) said cellular concrete has a wet density in a range of 14 to 23 pcf.

31. A method as in claim 29, wherein in step (d) said cellular concrete is cured and after curing has a dry density of 12 to 22 pcf.

32. A method as in claim 29, wherein in step (d) said cellular concrete is cured and after curing has a predetermined compressive gradient strength over a depth of penetration from 10 to 66 percent of its thickness.

33. A method as in claim 29, additionally comprising the step of:

including within said form a layer of cellular concrete material of higher strength than said cellular concrete of step (d) will have after curing.

* * * * *